United States Patent
Kim et al.

(10) Patent No.: US 7,513,632 B2
(45) Date of Patent: Apr. 7, 2009

(54) DIRECT-ILLUMINATION BACKLIGHT APPARATUS HAVING TRANSPARENT PLATE ACTING AS LIGHT GUIDE PLATE

(75) Inventors: Hyung Suk Kim, Kyungki-Do (KR); Jung Kyu Park, Seoul (KR); Ho Sik Ahn, Kyungki-Do (KR); Young June Jeong, Kyungki-Do (KR); Young Sam Park, Seoul (KR); Hun Joo Hahm, Kyungki-Do (KR); Bum Jin Kim, Kyungki-Do (KR)

(73) Assignee: Samsung Electro-Mechanics Co., Ltd., Suwon-Kyungki-Do (KR)

( * ) Notice: Subject to any disclaimer, the term of this patent is extended or adjusted under 35 U.S.C. 154(b) by 0 days.

(21) Appl. No.: 11/860,391

(22) Filed: Sep. 24, 2007

(65) Prior Publication Data

US 2008/0013315 A1    Jan. 17, 2008

Related U.S. Application Data

(63) Continuation of application No. 11/136,529, filed on May 25, 2005, now Pat. No. 7,273,291.

(30) Foreign Application Priority Data

Feb. 18, 2005    (KR)    ............ 10-2005-13659

(51) Int. Cl.
G01D 11/28    (2006.01)

(52) U.S. Cl. ............ 362/30; 362/330; 362/27; 362/29

(58) Field of Classification Search ............ 362/330, 362/26, 27, 29, 30, 307, 311, 606, 612, 613, 362/615, 620, 800; 349/62, 64

See application file for complete search history.

(56) References Cited

U.S. PATENT DOCUMENTS

| | | | |
|---|---|---|---|
| 6,561,663 B2 | 5/2003 | Adachi et al. | |
| 6,989,873 B2 | 1/2006 | Hua-Nan et al. | |
| 7,273,291 B2 * | 9/2007 | Kim et al. | ............ 362/30 |
| 2003/0117790 A1 | 6/2003 | Lee et al. | |

FOREIGN PATENT DOCUMENTS

| | | |
|---|---|---|
| JP | 11-024581 | 1/1999 |
| JP | 3092336 U | 12/2002 |
| JP | 2004-127680 A | 4/2004 |
| JP | 2004-347684 A | 9/2004 |
| JP | 2005-044661 A | 2/2005 |

OTHER PUBLICATIONS

Japanese Patent Office, Office Action mailed Aug. 28, 2007 and English Translation.

* cited by examiner

*Primary Examiner*—Bao Q Truong
(74) *Attorney, Agent, or Firm*—Lowe Hauptman Ham & Berner

(57) ABSTRACT

A direct-illumination backlight apparatus using LEDs includes a flat reflective plate, an LED light source, a transparent plate, a scattering pattern, and a light guide. The light guide serves to introduce a partial light from an LED light source at such an angle that the partial light is trapped inside the transparent plate, and the scattering pattern serves to scatter the trapped light beam at a position directly above the LED light source so that the scattered light beam escapes out of the transparent plate toward an LCD panel.

20 Claims, 8 Drawing Sheets

DIRECT-ILLUMINATION BACKLIGHT APPARATUS HAVING TRANSPARENT PLATE ACTING AS LIGHT GUIDE PLATE

CLAIM OF PRIORITY

This application is a continuation application of U.S. application Ser. No. 11/136,529, filed May 25, 2005, which claims the benefit of Korean Patent Application No. 10-2005-0013659 filed on Feb. 18, 2005, in the Korean Intellectual Property Office, the disclosures of which are incorporated herein by reference in their entirety.

BACKGROUND OF THE INVENTION

1. Field of the Invention

The present invention relates to a direct-illumination backlight apparatus using LEDs as a light source, more particularly, which is designed to introduce a partial light from an LED light source at such an angle that the partial light is trapped inside the transparent plate, and then scatter the trapped light beam at a position directly above the LED light source so that the scattered light beam escapes out of the transparent plate toward an LCD panel, thereby removing any dark area above the LED light source in the transparent plate and thus reducing its thickness.

2. Description of the Related Art

Liquid crystal display (LCD) backlight apparatuses using LEDs illuminate an LCD panel via direct-illumination or side-emitting illumination. In the side-emitting illumination, light from a light source is emitted in lateral directions and then re-directed upward via a reflective plate or a scattering pattern to illuminate the LCD panel. On the contrary, in the direct-illumination, light sources are installed under the LCD panel so that light emitted laterally from the light sources are projected upward onto the LCD panel.

FIG. 1 is a schematic cross-sectional view of a conventional side-emitting backlight apparatus. As shown in FIG. 1, the side-emitting backlight apparatus includes a reflective plate 12 having scattering patterns 14 formed thereon, a light guide plate 16 disposed on the reflective plate 12 and bar type LED light sources 18 and 20 disposed at both sides of the light guide plate 16.

The LED light sources 18 and 20 emit light L laterally into the light guide plate 16. Then, light L propagates through the light guide plate 16, and when colliding against the scattering patterns 14, is scattered upward thereby backlighting an LCD panel 22 above the light guide plate 16.

The side-emitting backlight apparatus 10 as above advantageously has a thin and simple structure. Another advantage of this backlight apparatus is that the intensity of light directed upward can be uniformly adjusted through the design of the scattering patterns 14 formed in the top face of the reflective plate 12 or the underside of the light guide plate 16. However, this structure is not applicable to a large-sized LCD since light from the LED light sources 18 and 20 can be sent to a limited distance only.

FIG. 2 is a schematic cross-sectional view of a conventional direct-illumination backlight apparatus. The direct-illumination backlight apparatus 30 includes a flat reflective sheet 32, a plurality of bar-shaped LED light sources 34 placed on the reflective sheet 32, reflective plates or light shades 36 placed on the LED light sources 34, respectively, a transparent plate 38 placed above the light shades 36 at a predetermined gap $G_1$ and a diffuser plate 40 placed above the transparent plate 38 at a predetermined gap $G_2$.

The LED light sources 34 emit lights $L_1$ and $L_2$ substantially in horizontal directions, and emitted light $L_1$ is reflected from the reflective sheet 32 and passes through the transparent plate 38. Then, light $L_1$ is diffused by the diffuser plate 40 to a desired uniformity to backlight an LCD panel placed above the diffuser plate 40. Another light $L_2$ comes into contact with the underside of the transparent plate 38 so that a part $L_{21}$ thereof enters by the transparent plate 38 and passes through the diffuser plate 40 above the transparent plate thereby backlighting the LCD panel. Meanwhile, another part $L_{22}$ of the light $L_2$ is reflected by the transparent plate 38 to the reflective sheet 32 and then reflected by the reflective sheet 32 to backlight the LCD panel 42 via the transparent plate 38 and the diffuser plate 40 like the light $L_1$.

The backlight apparatus 30 of this structure has an advantage in that it can effectively backlight a large-sized LCD since the plurality of bar-shaped LED light sources 34 are placed under the LCD panel 42.

However, the backlight apparatus 30 of this structure disadvantageously increases thickness since the gap $G_1$ is required between the LED light sources 34 and the transparent plate 38 and the gap $G_2$ is also required between the transparent plate 38 and the diffuser plate 40.

Describing this in more detail, when generated from the LED light sources 34, light L is reflected upward through between the light shades 36, such that dark areas DA screened by the light shades 36 are formed. In order to remove the dark areas DA and the resultant bright lines, the gap $G_2$ should be required to have at least a predetermined dimension to ensure a sufficient distance between the transparent plate 38 and the diffuser plate 40 so that light beams emitted from the transparent plate 38 can mix together before entering the diffuser plate 40.

As described above, since the gaps $G_1$ and $G_2$ are necessarily maintained at predetermined dimensions or more in order to impart uniformity to light directed from the reflective sheet 32 toward the LCD panel 42, the direct-illumination backlight apparatus 30 essentially suffers from thickness increase.

SUMMARY OF THE INVENTION

The present invention has been made to solve the foregoing problems of the prior art and it is therefore an object of the present invention to provide a direct-illumination backlight apparatus using LEDs as a light source that is designed to introduce a partial light from an LED light source at such an angle that the partial light is trapped inside the transparent plate, and then scatter the trapped light beam at a position directly above the LED light source so that the scattered light beam escapes out of the transparent plate toward an LCD panel, thereby removing any dark area above the LED light source in the transparent plate and thus reducing its thickness.

According to an aspect of the invention for realizing the object, there is provided a direct-illumination backlight apparatus, comprising: a flat reflective plate; an LED light source arranged on the reflective plate; a transparent plate arranged above the LED light source; a scattering pattern arranged on an underside of the transparent plate in a position corresponding to the LED light source; and a light guide made of transparent material, and arranged around the scattering pattern to introduce light incident from below into the transparent plate so that the light is internally reflected by the transparent plate.

Preferably, the light guide and the transparent plate have a same reflectivity.

Preferably, the light guide is in close face-to-face contact with the transparent plate.

It is preferred that the light guide is made of a transparent material selected from a group consisting of glass, acryl, plastic, Polymethylmethacrylate (PMMA) and epoxy.

It is also preferred that the light guide is shaped as an overturned prism, with a bottom of the light guide being attached to the underside of the transparent plate.

Preferably, the light guide is bonded to the transparent plate via adhesive.

In this case, it is preferred that the adhesive has a transmissivity of at least 99%.

Preferably, the scattering pattern is adapted to scatter and reflect light incident from inside the transparent plate.

In this case, it is preferred that the scattering pattern is adapted to reflect light incident from below the transparent plate.

Alternatively, it is preferred that the scattering pattern is adapted to transmit and reflect light incident from below the transparent plate while scattering the light.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 3:
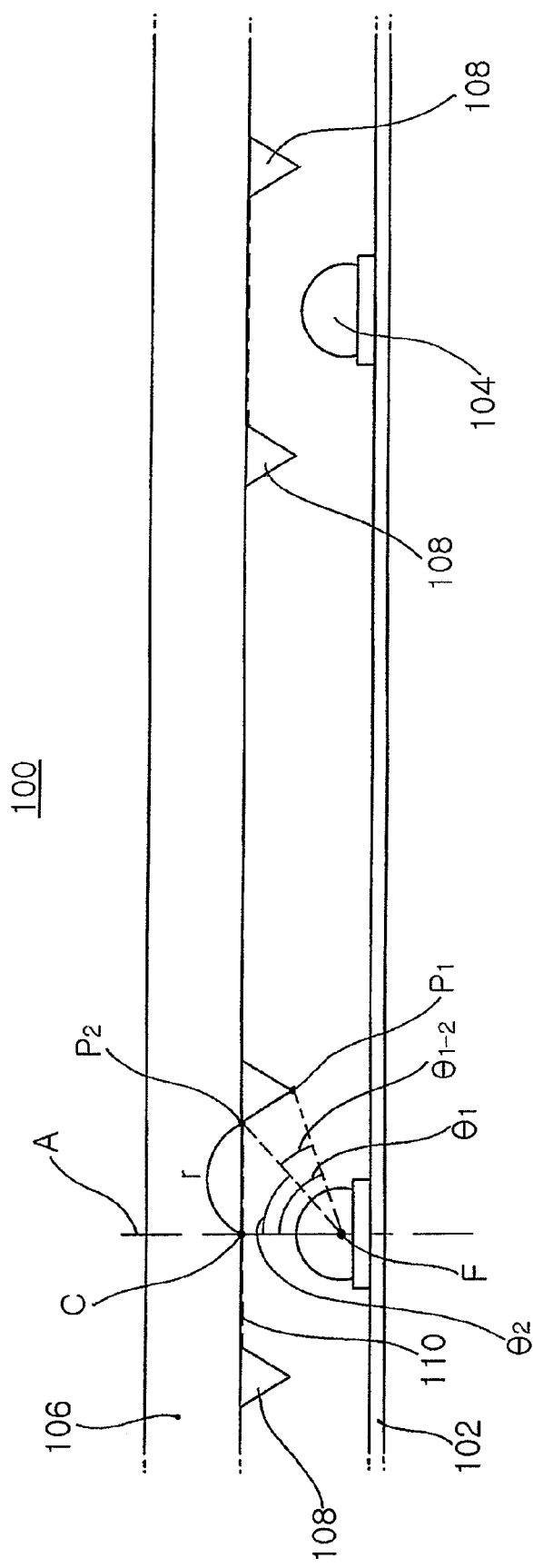
FIG. 3 is a schematic cross-sectional view of a direct-illumination backlight apparatus of the invention.

FIG. 3 is a schematic cross-sectional view of a direct-illumination backlight apparatus of the invention.

Referring to FIG. 3, the direct-illumination backlight apparatus 100 of the invention includes a flat reflective plate 102, a plurality of LED light sources 104 mounted on the reflective plate 102, a transparent plate 106 placed above the LED light sources 104, a plurality of scattering patterns 110 placed on the underside of the transparent plate 106 in positions opposed to the LED light sources 104 and transparent light-guide members 108 placed around the scattering patterns 110, respectively.

The reflective plate 102 is generally arranged in the form of a thin film or sheet on a base plate, and preferably has a Lambertian surface.

The LED light sources 104 are of monochromatic LEDs, and RGB LED light sources 104 are preferably combined and installed in the form of an array.

The transparent plate 106 is of a flat member of a predetermined thickness, and made of transparent material such as acryl, Polymethylmethacrylate (PMMA), plastic, epoxy and glass.

The scattering patterns 110 are formed on the underside of the transparent plate 106 in predetermined positions corresponding (or opposed) to the LED light sources 104, and adapted to scatter and reflect light that collide against the scattering patterns 110 from inside the transparent plate 106. Each scattering pattern 110 is round with a predetermined radius r. In this case, the center C of the each scattering pattern 110 is on a normal line or a vertical axis A passing through the center or focal point F of a corresponding LED light source 104.

Each light guide member 108 is shaped as an overturned prism. The base of the light guide member 108 is attached to the underside of the transparent plate 106 in close contact, preferably, via transparent adhesive.

The adhesive needs an opacity of 1% or less, and preferably, 0.1 to 0.8%, and a transmissivity of 90% or more, and preferably, 99% or more.

Examples of the adhesive may include "Optically Clear Laminating Adhesive" 8141, 8142, 8161 and 9483 available from 3M. These adhesives are used in lamination of LCD, PDP, touch-screen and so on, and have a reflectivity of about 1.474 reportedly satisfying the above-mentioned opacity and transmissivity ranges.

Such an adhesive is applied on the transparent plate 106 or the light guide plate 108 to a thickness of about 25 to 125 μm before attaching the light guide plate 108 to the transparent plate 106.

The light guide member 108 is made of transparent material such as acryl, plastic, Polymethylmethacrylate (PMMA), epoxy and glass. In addition, the light guide member 108 is preferably made of the same material as the transparent plate 106 in order to prevent any refraction or reflection of light when entering the transparent plate 106 from the light guide plate 108. Otherwise, at least a material of a similar refractivity is selected for the light guide member 108 to preferably minimize reflection or refraction.

Studying the arrangement of the light guide member 108 in more detail, a line passing through a lower vertex $P_1$ of each light guide member 108 and the focal point F of a corresponding LED light source 104 is oriented at a first angle $\theta_1$ from the vertical axis A, and a line passing through an inner proximal edge $P_2$ of the light guide member 108 and the LED focal point F is oriented at a second angle $\theta_2$ from the vertical axis A. Thus, the light guide member 108 is adapted to receive light in an angular range corresponding to an included angle $\theta_1-\theta_2$ between the first and second angles $\theta_1$ and $\theta_2$ from the LED light source 104.

Figure 4:
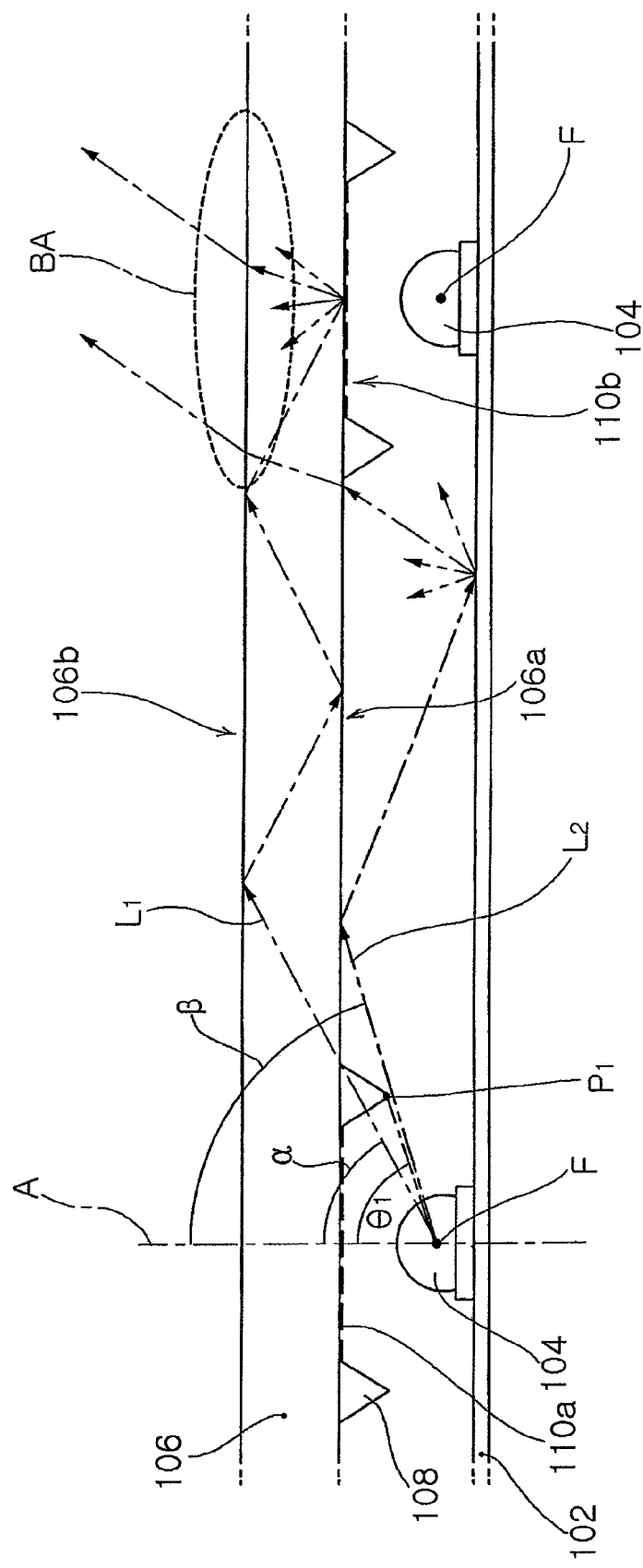
FIG. 4 is an illustration on the operation of the direct-illumination backlight apparatus of the invention.

FIG. 4 is an illustration on the operation of the direct-illumination backlight apparatus of the invention.

Referring to FIG. 4 together with FIG. 3 above, when receiving a light beam $L_1$ emitted from the focal point F at an angle α between the first and second angles $\theta_1$ and $\theta_2$, the light guide plate 108 is adapted to introduce the light beam $L_1$ according to its direction into the transparent plate 106. Upon being introduced into the transparent plate 106, the light beam $L_1$ propagates through the transparent plate 106 while being internally reflected between the underside and top surface 106a and 106b of the transparent plate 106. Then, the transparent plate 106 can act as a Light Guide Plate (LGP). When the light beam L1 collides against a scattering patterns 110b, it is reflected upward upon thereby. The reflected light beam $L_1$ is radiated out of the transparent plate 106 to backlight an LCD panel (c.f., FIG. 2) arranged above the transparent plate 106.

In this way, it is possible to provide backlight illumination to the LCD panel through upper bright areas BA directly above the LED light sources 104. Comparing this with the prior art in FIG. 2, the upper bright areas BA are located in the same position as the dark areas DA of the prior art. Accordingly, since the invention removes the dark areas DA of the prior art by adopting the light guide members 108 and the scattering patterns 110, it is possible to reduce the gap $G_2$ between the transparent plate 38 and the LCD panel 40 required in the prior art. As a result, the present invention can advantageously reduce the entire thickness of the backlight apparatus.

In the meantime, a light beam $L_2$ emitted at an angle β larger than the first angle $θ_1$ does not enter the light guide member 108 but reflects from the underside 106a of the transparent plate 106 downward toward the reflective plate 102. The reflective sheet 102 reflects the light beam $L_2$, such that the reflected light beam $L_2$ passes through the above transparent plate 106 to backlight the LCD panel (c.f., FIG. 2).

Figure 5:
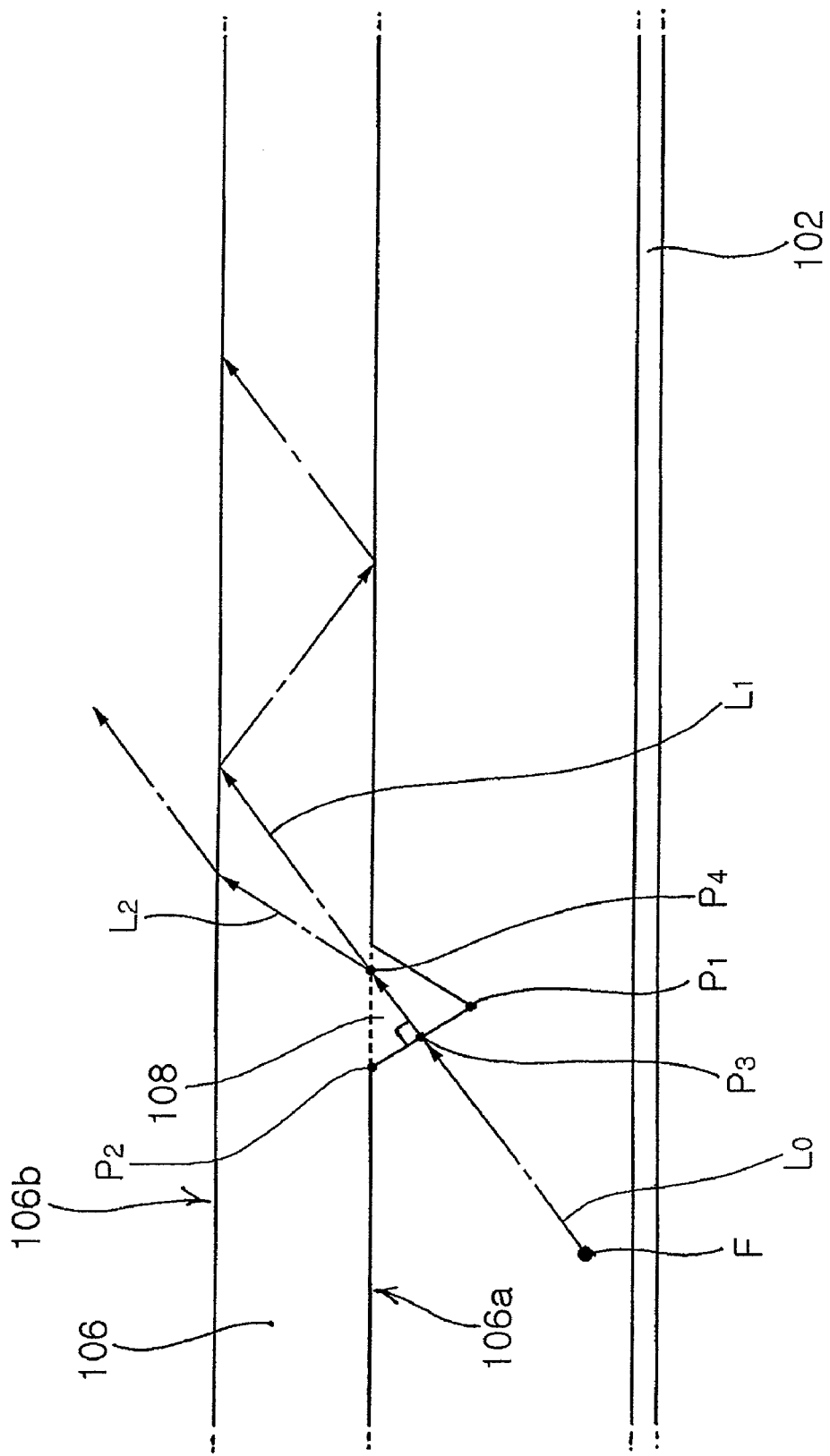
FIG. 5 is an illustration for comparing a light-guiding function of the invention with a conventional light-transmitting function.

Describing it in more detail with reference to FIG. 5, a light beam $L_0$ emitted from the focal point F enters the light guide member 108 through an incident point $P_3$ on a side face thereof. In this case, it is preferable that the light guide member 108 and its focal point F are so arranged that the incident point $P_3$ is centered on the side face of the light guide member 108 and the light beam $L_0$ is incident vertically onto the light guide member 108.

Then, the light beam $L_0$ enters the transparent plate 106 through an incident point $P_4$ on an interface between the light guide member 108 and the transparent plate 106. (Hereinafter any light beam inside the transparent plate 106 will be marked with $L_1$.) If the light guide member 108 has the same refractivity as of the transparent plate 106, the light beam $L_1$ advances straight from the light guide member 108 into the transparent plate 106 without refraction. If there exists any refractivity difference, the light beam $L_1$ will be refracted slightly according to the refractivity difference. Thus, the light guide member 108 preferably has a refractivity the same as or at least similar to that of the transparent plate 106.

Upon having advanced into the transparent plate 106, the light beam $L_1$ is internally reflected between the underside and top surface 106a and 106b of the transparent plate 106 before colliding against the scattering pattern 110, which reflects and enables the light beam $L_1$ to escape out of the transparent plate 106.

On the other hand, in case of the prior art without the light guide member 108, the light beam $L_0$ directly enters the transparent plate 106 through the incident point P4 on the transparent plate underside 106a. Then, according to the refractivity difference between the air and the transparent plate 106, the light beam $L_2$ advances along a refracted path and thus is radiated upward through the transparent plate top surface 106b without being internally reflected thereby.

Comparing these two cases, it can be understood that the light guide member 108 serves to change the path of a light beam entering the transparent plate 106 and thus trap the light beam inside the transparent plate 106, so that the transparent plate 106 can act as an LGP.

In order to obtain this purpose, the first and second angles $θ_1$ and $θ_2$ between the light guide member 108 and the focal point F are so adjusted that a light beam upon passing through the light guide member 108 can collide against the top surface of the transparent plate 106 under internal reflectivity conditions. Since some factors of the internal reflectivity conditions are a refractivity difference between the transparent plate 106 and a medium (the air in general) above the transparent plate 106 and an angle of the light beam colliding against the top surface 106b, the relative position between the light guide member 108 and the focal point is determined by considering these factors.

Now exemplary scattering patterns of the invention will be described with reference to FIGS. 6a and 6b.

Figure 6A:
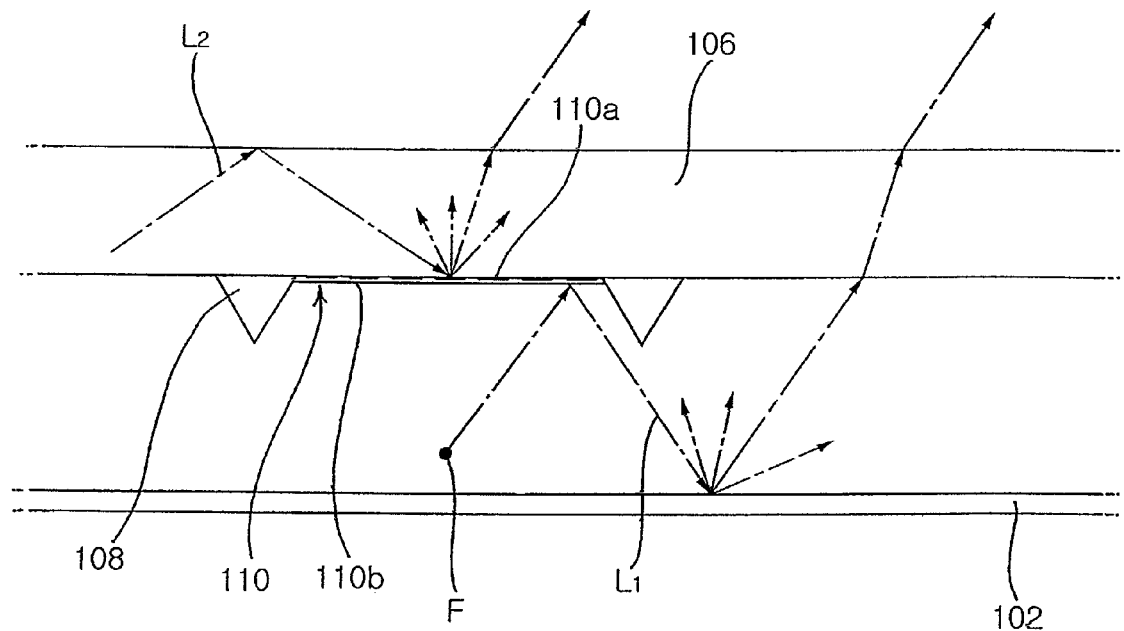
FIGS. 6a and 6b are cross-sectional views of exemplary scattering patterns of the invention.

A scattering pattern 110 shown in FIG. 6a includes an upper scattering layer 110a and a lower mirror layer 110b. The scattering layer 110a serves to scatter and reflect a light beam $L_2$ propagating through the transparent plate 106, enabling the light beam $L_2$ to escape out of the transparent plate 106. The scattering layer 110a is made of a scattering ink layer or a microscopic roughened structure.

Figure 1:
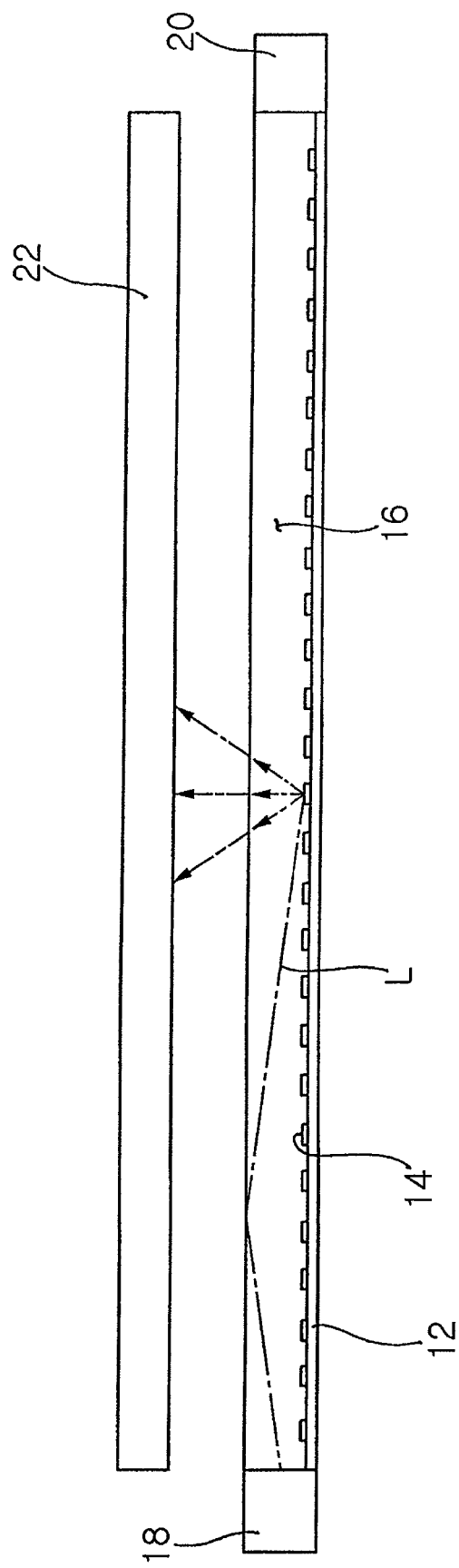
FIG. 1 is a schematic cross-sectional view of a conventional side-emitting backlight apparatus.
Figure 2:
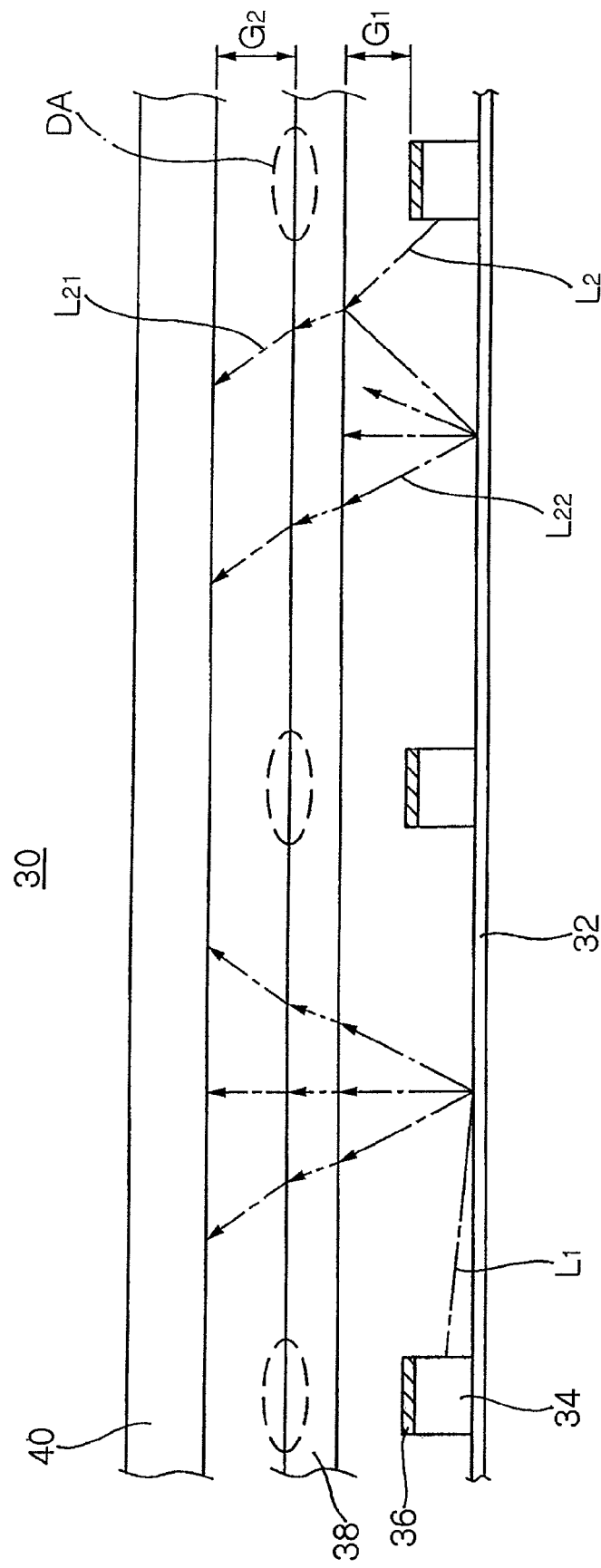
FIG. 2 is a schematic cross-sectional view of a conventional direct-illumination backlight apparatus.

The lower mirror layer 110b gives mirror reflection to a light beam $L_1$ emitted from the focal point F. Then, the light beam $L_1$ is reflected upward from the reflective plate 102, and passes through the transparent plate 106 to backlight the LCD panel (c.f. FIG. 2). The mirror layer 110b may be made of metal or polymer having a high reflectivity.

Figure 6B:
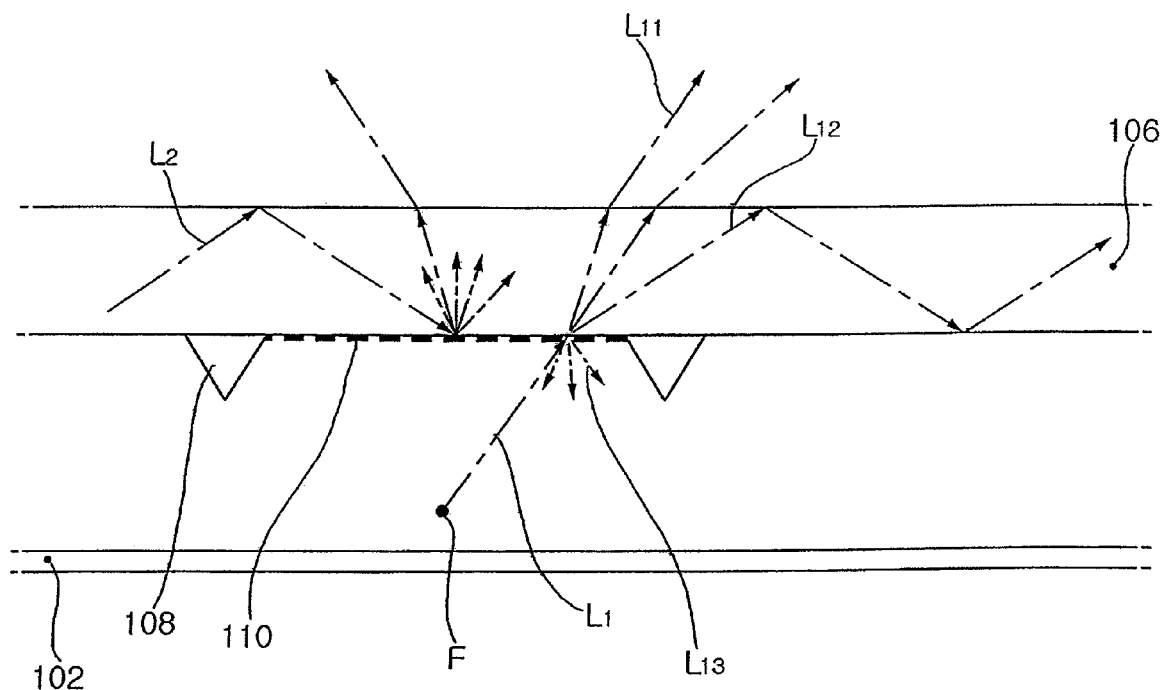

As shown in FIG. 6b, a light beam $L_2$ trapped inside the transparent plate 106 by the light guide member 108 is scattered upward by a scattering pattern 110, and then escapes out of the transparent plate 106. The scattering pattern 110 is also adapted to transmit/reflect a light beam $L_1$ from the focal point F while scattering it. That is, a partial light beam $L_{11}$ is allowed to pass through the scattering pattern 110 at an angle for passage through the transparent plate 106, another partial light beam $L_{12}$ is allowed to pass through the scattering pattern 110 at an angle for being trapped inside the transparent plate 106, and a third partial light beam $L_{13}$ is reflected downward. In a similar manner to the light beam $L_2$, the partial light beam $L_{12}$ is scattered upward when it collides against this scattering pattern again or a different scattering pattern 110 and thus escapes from the transparent plate 106 to backlight the LCD panel (c.f. FIG. 2).

The scattering pattern 110 is made of a material having a reflectivity and a transmissivity in a predetermined range so as to scatter incident light while reflecting/transmitting it.

Examples of the scattering pattern 110 may include an ink layer made of scattering ink. This ink layer is applied on the underside 106a of the transparent plate 106, and serves to scatter incident light while reflecting/transmitting it.

In addition to the scattering patterns in FIGS. 6a and 6b, a scattering pattern for reflecting light while never or rarely transmitting it can be provided on the underside 106a of the transparent plate 106. An example may be realized by applying scattering ink at a sufficient thickness to lower transmissivity but raise reflectivity. Besides, by raising the portion of high reflectivity material such as $SiO_2$ and thus the reflectivity of ink itself, a scattering pattern may have an enhanced scattering-reflecting function.

The scattering ink for printing the scattering pattern 110 contains scattering agent (or diffusing agent), binder and solution. The scattering or diffusing agent is made of inorganic particles, and preferably, fine power of inorganic oxides such as $TiO_2$ and $SiO_2$. $TiO_2$ and $SiO_2$ are uniformly dispersed with a particle size of several nm to several μm. In the meantime, binder serves to fix the inorganic oxide particles and adjust the viscosity of solution.

Now the principle of light scattering at such ink patterns will be explained referring to FIGS. 7a and 7b.

Figure 7A:
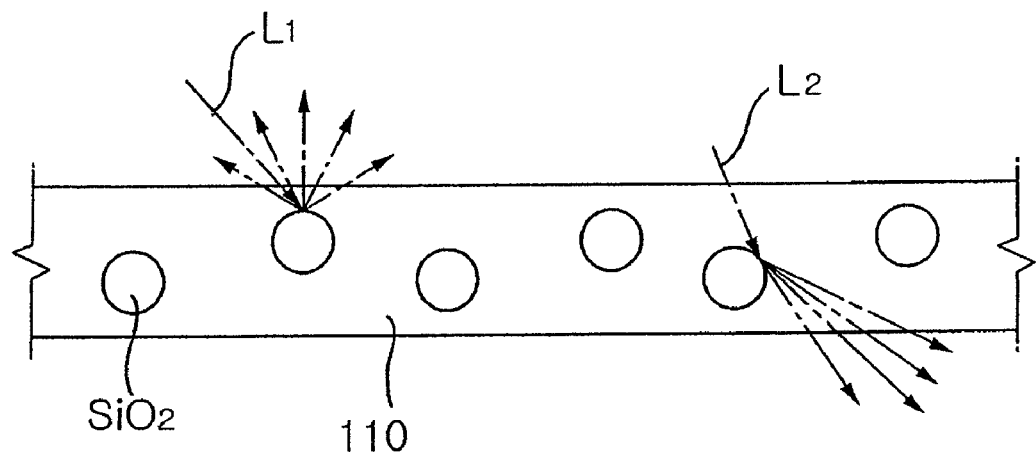
FIGS. 7a and 7b are cross-sectional views illustrating light scattering by scattering patterns of the invention.

Referring to FIG. 7A, light beams $L_1$ and $L_2$ incident to a scattering pattern 110 are scattered by $SiO_2$ particles. That is, the light beam $L_1$ is scattered by $SiO_2$ particles and reflected from the scattering pattern 110, and the light beam $L_2$ is scattered by SiO2 particles while transmitting through the scattering patterns 110. Thus, by applying such scattering patterns 110 to the transparent plate, it is possible to uniformly discharge light from the whole area of the transparent plate 106 as described referring to FIG. 6b.

Meanwhile, since the $SiO_2$ particles are transparent, the scattering pattern 110 can be advantageously used in a thin notebook computer monitor.

Figure 7B:
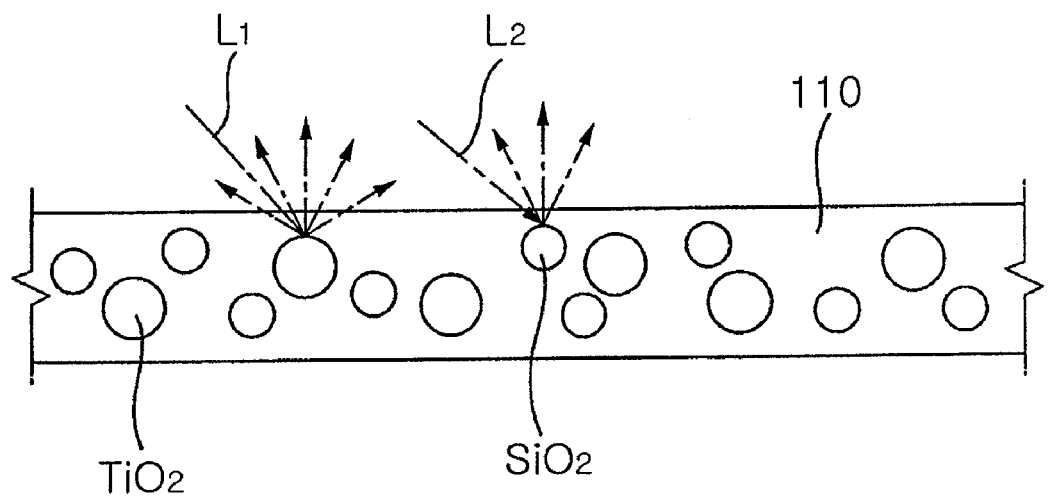

Referring to FIG. 7b, light beams $L_1$ and $L_2$ incident to a scattering pattern 110 are scattered by $TiO_2$ and $SiO_2$ particles. In addition, although not illustrated, the light beams can be scattered by $TiO_2$ and $SiO_2$ particles while transmitting through the scattering pattern 110 like the light beams $L_2$ in FIG. 6b.

Meanwhile, since $TiO_2$ particles have light diffusivity larger than $SiO_2$ particles to obtain a great quantity of light, the scattering patterns 110 of FIG. 7b can be advantageously used in a flat monitor thicker than the notebook computer monitor.

Figure 8:
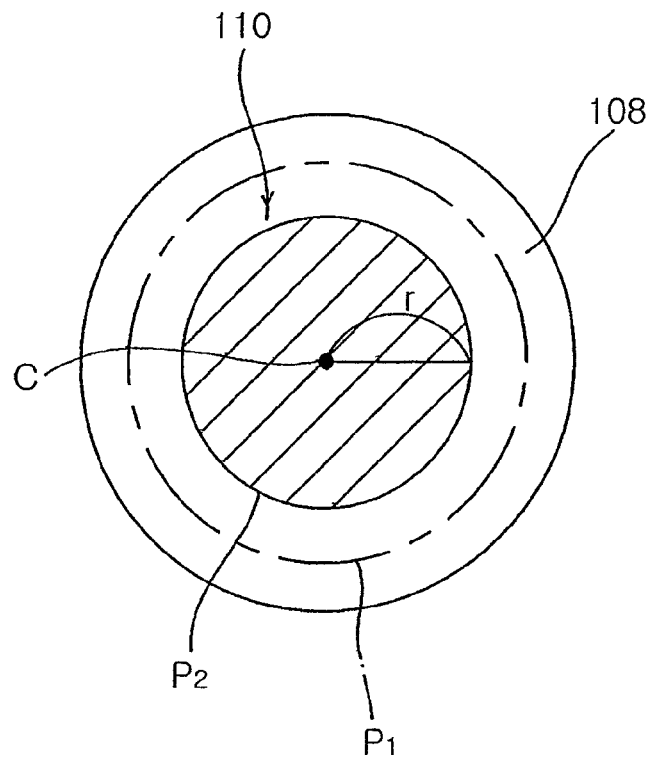
FIGS. 8 and 9 are bottom views of scattering patterns of the invention.
Figure 9:
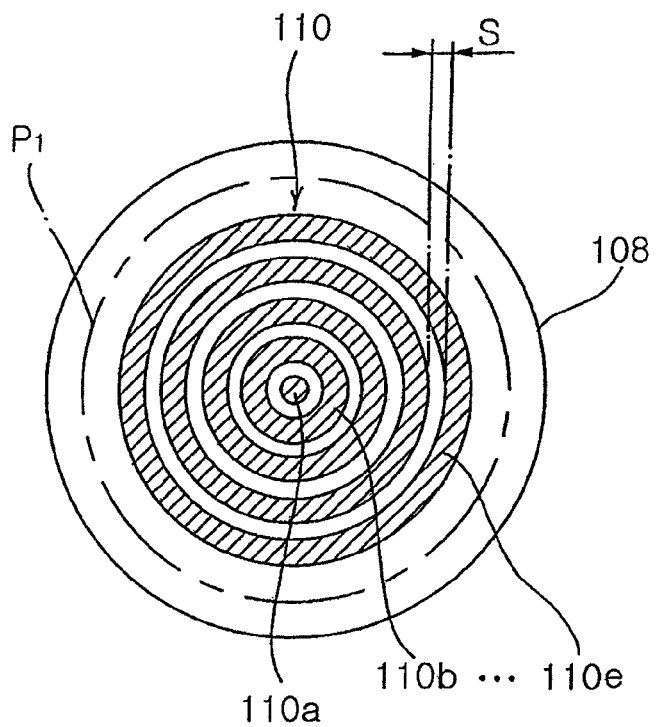

With reference to FIGS. 8 and 9, a light guide member and a scattering pattern will now be illustrated in plan views.

As shown in FIG. 8, a scattering pattern 110 is round, and a ring-shaped light guide plate 108 is arranged around the round scattering pattern 110. In FIG. 8, a one-dot chain line indicates a lower vertex P1 of the light guide member 108.

A scattering pattern 110 may be provided in a configuration as shown in FIG. 9. That is, a plurality of scattering areas 110a, 110b, . . . and 110e are arranged at a predetermined spacing S.

This arrangement can adjust the quantity of light entering the transparent plate and the quantity of light internally reflected by the transparent plate according to the number and the width of the spacing S and the scattering areas 110a to 110e. Since areas spanning the spacing S of the scattering pattern 110 transmit light into the transparent plate 106 without reflecting it, the quantity of light entering the transparent plate 106 through the scattering pattern 110 by enlarging the spacing S if necessary.

Of course, the scattering pattern may be provided in various shapes rather than the above round shape. For example, the scattering pattern may be rectangular, square or elliptic. In addition, it is possible to provide a scattering pattern by connecting scattering areas corresponding to respective LED light sources. This arrangement is advantageous if the LED light sources are arranged adjacent to one another.

In addition, instead of surrounding the scattering pattern, the light guide member may be provided as a pair of members opposed to each other about the scattering pattern.

According to the direct-illumination backlight apparatus of the invention as described hereinbefore, the light guide member serves to introduce a partial light from an LED light source at such an angle that the partial light is trapped inside the transparent plate, and the scattering pattern serves to scatter the trapped light beam at a position directly above the LED light source so that the scattered light beam escapes out of the transparent plate toward an LCD panel. This as a result can remove any dark area above the LED light source in the transparent plate and thus reduce the thickness of the direct-illumination backlight apparatus.

While the present invention has been shown and described in connection with the preferred embodiments, it will be apparent to those skilled in the art that modifications and variations can be made without departing from the spirit and scope of the invention as defined by the appended claims.

What is claimed is:

1. A direct-illumination backlight apparatus, comprising:
a flat reflective plate;
an LED light source arranged on the reflective plate;
a transparent plate arranged above the LED light source;
a scattering pattern arranged on an underside of the transparent plate in a position corresponding to the LED light source, the scattering pattern spaced apart from the LED light source; and
a light guide made of transparent material, and arranged around the scattering pattern to introduce light incident from below into the transparent plate so that the light is internally reflected by the transparent plate.

2. The direct-illumination backlight apparatus according to claim 1, wherein the light guide and the transparent plate have a same refractivity.

3. The direct-illumination backlight apparatus according to claim 1, wherein the light guide is in close face-to-face contact with the transparent plate.

4. The direct-illumination backlight apparatus according to claim 1, wherein the light guide is made of a transparent material selected from a group consisting of glass, acryl, plastic, Polymethylmethacrylate (PMMA) and epoxy.

5. The direct-illumination backlight apparatus according to claim 1, wherein the light guide is shaped as an overturned prism, with a bottom of the light guide being attached to the underside of the transparent plate.

6. The direct-illumination backlight apparatus according to claim 1, wherein the light guide is bonded to the transparent plate via adhesive.

7. The direct-illumination backlight apparatus according to claim 6, wherein the adhesive has a transmissivity of at least 99%.

8. The direct-illumination backlight apparatus according to claim 1, wherein the scattering pattern is adapted to scatter and reflect light incident from inside the transparent plate.

9. The direct-illumination backlight apparatus according to claim 8, wherein the scattering pattern is adapted to reflect light incident from below the transparent plate.

10. The direct-illumination backlight apparatus according to claim 8, wherein the scattering pattern is adapted to transmit and reflect light incident from below the transparent plate while scattering the light.

11. The direct-illumination backlight apparatus according to claim 1, wherein said scattering pattern is in direct contact with the underside of the transparent plate for scattering upwardly light incident from inside the transparent plate.

12. The direct-illumination backlight apparatus according to claim 1, wherein the underside of said transparent plate has a portion free of said scattering pattern and light guide.

13. The direct-illumination backlight apparatus according to claim 12, wherein said portion of the underside of said transparent plate is adapted to reflect light directly incident thereon from the LED light source downwardly toward the reflective plate.

14. The direct-illumination backlight apparatus according to claim 1, wherein said light guide extends for full 360 degrees around said scattering pattern.

15. The direct-illumination backlight apparatus according to claim 1, wherein said light guide is configured to directly receive only light that is generated from the LED light source at a predetermined acute angle relative to an upward vertical direction.

16. The direct-illumination backlight apparatus according to claim 1, wherein said scattering pattern comprises:
an upper scattering layer directly arranged on the underside of the transparent plate for scattering and reflecting upwardly light propagating through the transparent plate under conditions of total internal reflection; and a lower mirror layer below said upper scattering layer for reflecting light incident thereon from below downwardly toward the reflective plate.

17. A direct-illumination backlight apparatus, comprising:
a reflective plate;
an LED light source arranged on the reflective plate;
a transparent plate arranged above the LED light source and having opposite upper side and underside;
a scattering pattern arranged directly on the underside of the transparent plate in a position corresponding to the LED light source, the scattering pattern spaced upwardly from the LED light source; and
a light guide made of transparent material, and arranged adjacent the scattering pattern to introduce light incident from below into the transparent plate under conditions of total internal reflection so that the light is internally reflected within the transparent plate until said internally reflected light is incident upon the scattering pattern which is adapted to scatter the incident light upwardly.

18. The direct-illumination backlight apparatus according to claim 17, wherein the light guide is shaped as an overturned prism, with a bottom of the prism being attached to the underside of the transparent plate.

19. The direct-illumination backlight apparatus according to claim 17, wherein the underside of said transparent plate has a portion free of said scattering pattern and light guide, and wherein said portion of the underside of said transparent plate is adapted to reflect light directly incident thereon from the LED light source downwardly toward the reflective plate.

20. The direct-illumination backlight apparatus according to claim 19, wherein said light guide is configured to directly receive only light that is generated from the LED light source at a predetermined acute angle relative to an upward vertical direction.

\* \* \* \* \*